3,704,254
PROCESS FOR SEPARATING PHOSPHATIDES
Rajindra Aneja, Welwyn Garden City, England, assignor to Lever Brothers Company, New York, N.Y.
No Drawing. Filed Nov. 27, 1968, Ser. No. 779,589
Int. Cl. A23j 7/00; C07f 9/02
U.S. Cl. 260—403          10 Claims

ABSTRACT OF THE DISCLOSURE

N-acylphosphatides, for instance N-acetylcephalin, are separated from phosphatides without an acylatable amino group, for instance lecithin, by making a mixture containing them basic with a nitrogen base, for example triethylamine, to the equivalent of pH at least 8.5 under aqueous conditions and solvent-fractionating with acetone or methyl acetate.

---

This invention relates to a process for the separation of phosphatides from mixtures containing them.

Phosphatide mixtures are obtained as by-products in the production of vegetable oils and are used in the margarine industry for their emulsifying properties in water-in-oil emulsions. Such phosphatide mixtures consist of various phosphatides, and especially ethanolamine, serine, inositol and choline phosphatides, together with neutral triglyceride oil, free fatty acids, water and other accompanying substances, including small quantities of steroids. The amounts of triglyceride oil present in commercial phosphatides are often within the region of 30 to 40% by weight of the total material, and the products are viscous liquids. In commerce mixtures of these phosphatides are often referred to as lecithin, but this name is also used more specifically for the choline phosphatide itself, and it is in this latter sense that lecithin is used in this specification.

Ethanolamine and serine phosphatides have the structure

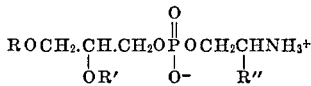

where R and R' are long chain fatty acid radicals and R" is hydrogen and hydroxycarbonyl respectively: these phosphatides are together known under the name cephalin. Inositol phosphatides have the structure

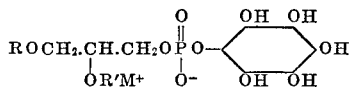

where R and R' are long chain fatty acid radicals and M is a metal atom, for instance sodium, potassium, calcium or magnesium, and the inositol group may be substituted by glycoside and other radicals. A very active emulsifier component of the phosphatide mixtures is the choline phosphatide, lecithin, which has the structure

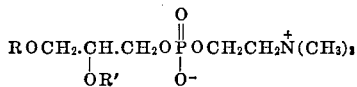

where R and R' are long chain fatty acid radicals. All four phosphatides have an acid hydroxy group, shown above in salt form, but of the three nitrogenous phosphatides only lecithin has no free amino group.

Where cephalin and lecithin are present together in a phosphatides mixture, as in the by-products mentioned above, the cephalin has a deleterious effect on the emulsifying properties of the lecithin by some kind of antagonising action, for instance when used in margarine: other undesirable characteristics have also been attributed to cephalin; thus, parenterally administered fat emulsions prepared using phosphatides containing cephalin have a hypertensive action for which the cephalin present is responsible, and when phosphatide mixtures are hydrogenated cephalin present is commonly believed to have a deactivating effect on the catalyst. On the other hand no disadvantage attends the presence of inositol phosphatides.

Accordingly, methods have been sought for avoiding the deleterious effect of the cephalin. In one such process, described in French Pat. 1,507,922, vegetable phosphatide mixtures are modified by reacting the free amino group of the cephalin present with an acylating agent. This forms acylcephalin which does not antagonise the emulsifying properties of lecithin, so that the phosphatide mixture, in which the acylcephalin remains present, has an improved emulsifying action.

Attempts have been made to separate cephalin from lecithin in phosphatide mixtures in order to obtain a phosphatide with a higher lecithin concentration having improved properties but this has proved a difficult problem. Solvent fractionation results in a partial separation, providing lecithin-enriched and cephalin-enriched fractions, and British Pat. 1,113,241 describes an enrichment process of this kind using an aqueous alcohol extraction by which the proportion of lecithin to cephalin is increased by from 1:1 to from 5:1 in the extract, but substantial proportions of lecithin remain in the residue.

The present invention is concerned with a method of treating phosphatide mixtures to give free-flowing solid phosphatides which are practically free from cephalin.

It has been discovered that if phosphatide mixtures containing cephalin and lecithin are acylated to convert the cephalin present into acylcephalin, the lecithin and acylcephalin can be readily separated by solvent fractionation with acetone or methyl acetate when sufficient of an acetone-soluble or methyl acetate-soluble nitrogen base is present to provide basic conditions equivalent to a pH in water of at least 8.5. The acylcephalin is extracted by the solvent, leaving the lecithin behind. Moreover, the separation is effective even in the presence of large amounts of triglyceride oil such as are present in commercial phosphatides; triglycerides are removed with the cephalin.

Accordingly, the present invention provides a process for separating an N-acylphosphatide from a phosphatide without an acylatable amino group in which a mixture comprising them is made basic with a nitrogen base to the equivalent of pH at least 8.5 under aqueous conditions and solvent-fractionated with acetone or methyl acetate.

In practice a phosphatide mixture comprising N-acylatable and non-N-acylatable phosphatides is reacted with an acylating agent to convert the N-acylatable phosphatide to N-acylphosphatide, and the acylated product is made basic with a nitrogen base to the equivalent of pH at least 8.5 under aqueous conditions and solvent-fractionated with acetone or methyl acetate.

In practice the N-acylatable phosphatide is cephalin, and at least some lecithin is preferably present as non-acylatable phosphatide, so that the phosphatide mixture comprises cephalin and lecithin. As phosphatide starting materials for the separation process thare can be used commercial phosphatides, for instance the hydrated vegetable phosphatides obtained by treating with a small amount of water a phosphatide-containing crude oil extracted from plants, for example crude soyabean oil, so that the phosphatides become hydrated and are precipitated as a gum and are then separated. Egg yolk phosphatides can also be used. Preferably the phosphatide mixture contains from 0.1 to 20 parts of lecithin to each part by weight of cephalin. Such phosphatides and modifications of them that can be used are described in British Pat. 1,118,373. Lecithin-enriched or cephalin-enriched phosphatides obtained by solvent fractionation with aqueous alcohols as described in British Pat. 1,113,241 can be used. Vegetable phosphatide compositions containing up to 80%, for instance from 20 to 60% triglyceride oil can be used. The acylated phosphatide mixtures obtained as described in French Pat. 1,507,922 can also be employed. Partially hydrogenated phosphatide mixtures can be used where the original fatty acyl groups included those of unsaturated fatty acids and some of these have been saturated by hydrogenation. The phosphatide starting materials can contain appreciable quantities of water even before the acylation step, for it has been found that the presence of water does not seriously interfere with N-acylation and helps to prevent O-acylation by excess acylating reagent which would give rise to phosphatides in which the oxy groups of inositol phosphatides present, as well as the oxy group attached to the phosphorus atom, are acylated: acylation at the phosphorus atom causes no problem as the acyl group can be removed by aftertreatment with water, but the acylation of inositol groups can represent an unnecessary loss of acylating agent, for inositol phosphatides can be present in large proportions: also, once acylated, the inositol hydroxy groups concerned cannot be re-formed because the conditions necessary for this would remove the acyl groups esterifying the glyceryl radical and thus destroy the phosphatides.

As acylating agent there is preferably used a carboxylic acid anhydride, especially a fatty acid anhydride, for example acetic, propionic, capric, oleic or stearic anhydrides, or mixed anhydrides such as those obtained from soyabean fatty acids by trans-anhydridisation with acetic anhydride: maleic, succinic, or phthalic anhydride can also be used. Other acylating agents, for instance acyl chlorides such as acetyl chloride, and ketene, can be used, but as they react more readily with water and with hydroxy groups of substances present in the starting materials, they are less efficient than anhydrides. The amount of acylating agent required is that necessary to acylate all the free amino groups present, with allowance for loss of reagent where water present competes by hydrolysis. As phosphatides rarely contain more than 30% of cephalin, 4% of acetic anhydride by weight of phosphatide is usually satisfactory. Where the phosphatide starting material is highly viscous, reaction can be carried out in a suitable inert solvent medium, for instance in hexane, benzene, or chloroform, or even in acetone or methyl acetate where substantial amounts of triglyceride are present, but no solvent is generally necessary where the phosphatide mixture contains sufficient triglyceride oils to make it fluid. The mixture should be stirred during reaction, and this is especially desirable where no solvent is employed. The acylation can be conducted in an inert atmosphere, for instance under nitrogen.

The acylation is preferably carried out in the presence of a non-acylatable amine as catalyst. Suitable catalysts are tertiary amines, for example pyridine and tertiary alkylamines, especially trimethylamine and triethylamine.

If no catalyst is used acylation may not go to completion even with a considerable excess of acylating agent, and the reaction time and temperature necessary are longer and higher, respectively, for instance from 1 to 2 hours at from 55° to 70° C.; or 24 hours at 30° C. Reaction at 90° C. requires only a few minutes but temperatures above 80° C. are preferably avoided. When a catalyst is used only a small excess is necessary, reaction is rapid and with lower fatty acid anhydrides, for example acetic anhydride, proceeds to completion even at room temperatures within a few minutes. Preferably, therefore, when a catalyst is employed reaction is carried out at room temperature.

The progress of the acylation reaction can be followed by thin layer chromatography on silica gel plates with as mobile phase a mixture of chloroform, methanol and water in proportions of 65:25:4 by volume, and treatment of the developed chromatogram with ninhydrin reagent. Reaction is complete when the pink spot of $R_f$ about 0.6 due to free primary amino compound is no longer visible. Preliminary tests can be carried out using this technique to determine the amount of acylating agent and other conditions most appropriate for use in acylating any particular phosphatide mixture, for instance a mixture of unknown N-acylatable phosphatide content.

After acylation the by-product free fatty acid and excess acylating agent can be neutralised, or where the acid and acylating agent is volatile, they can be evaporated off, for instance under reduced pressure. Any solvent which would interfere with the subsequent fractionation can also be removed by evaporation. The solvent, acid, excess acylating agent and triglyceride oil can also be removed by extraction of the product with acetone before it is made alkaline.

In the solvent fractionation step, which will normally consist of extracting with the solvent and separating the phases containing the N-acylphosphatide without an acylatable amino group, acetone or methyl acetate (or a mixture of them) is used in conjunction with a nitrogen base of adequate basicity. The nitrogen base can be added to the acylation product, but where a sufficient amount of acylation catalyst of adequate basicity remains to provide suitable alkaline conditions it is unnecessary to add further nitrogen base before fractionation: alternatively, the nitrogen base can be incorporated in the fractionating solvent. Moreover, acylation and solvent-extraction can be effected simultaneously, as where a solid phosphatide free of triglyceride oil is suspended in acetone containing acylating agent and a non-acylatable amine that acts both as catalyst and base. Where acylation is carried out without a catalyst, preferably the nitrogen base is added to the acylation mixture before unreacted acylating agent is separated from it, as this ensures acylation is complete. The function of the nitrogen base in the fractionation is postulated as that of converting the acylphosphatide into its conjugate anion, for example:

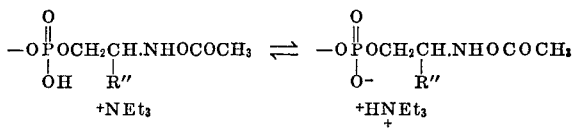

so that possibly when acetone or methyl acetate is added the negative ions repel one another, are unable to form aggregates and dissolve in the solvent.

Suitable nitrogen bases are amines of high $pK_a$, preferably at least 9, especially primary, secondary and tertiary aliphatic amines, such as alkylamines, and include the following compounds with $pK_a$ as indicated: diethylamine 10.9, dimethylamine 10.8, triethylamine 10.7, methylamine 10.6, ethylamine 10.6, trimethylamine 9.8, ethanolamine 9.5 and ammonia 9.2 can also be used, though they are less effective because they promote aggregation through hydrogen bonding. Quaternary ammonium hydroxides, for instance tetraethyl ammonium hydroxide, which react with the acylcephalin to give its conjugate anion and water can also be used. An amount of nitrogen base sufficient to provide basic conditions equivalent to a pH in water of at least 8.5, and preferably at least 9, is employed: the amount necessary is determined simply by testing the quantity of nitrogen base needed to give the required pH when a sample of the acylated phosphatide composition is dispersed in water at 1% concentration. The amount required is more than the minimum necessary for use as a catalyst in the acylation step.

The fractionation step can be carried out using the standard procedure of acetone extraction for determination of acetone-insoluble matter in phosphatides described in the American Oil Chemists' Society Official Method Ja 4–46. The acetone extraction removes acylcephalin and any triglyceride oil present, leaving the lecithin-rich fraction as residue. The material to be fractionated can be extracted several times with acetone containing nitrogen base and finally with acetone alone. Methyl acetate can be used similarly. Extraction is preferably carried out at room temperature.

Although a total separation of acylcephalin and lecithin may not be achieved in any particular case, a much more complete fractionation is effected than when attempts are made to separate the components with acetone without the nitrogen base present. The residues from extraction contain very little acylcephalin and are obtained as straw-coloured solids which on grinding form free-flowing powders that are readily dispersible in water or triglyceride oils. They are particularly valuable as emulsifiers and dispersing agents. The acylcephalin produced can be recovered from the acetone extracts after removal of nitrogen base and acetone by suitable methods, for instance evaporation: the acylcephalins can also be used as emulsifiers. An acylcephalin can be reconverted to cephalin where the acyl group is of such a nature that it can be removed without destruction of the cephalin: thus if acylation is effected with phthalic anhydride, the resulting o-carboxybenzoylcephalin can be cyclised by heating or the action of acetic anhydride to give phthaloylcephalin and cephalin liberated from this by heating with hydrazine.

Those products of the process of the invention that contain both lecithin and inositol phosphatides can be further fractionated with alcohol to provide alcohol-soluble fractions enriched in lecithin and alcohol-insoluble fractions enriched in inositol phosphatides.

The invention is illustrated by the following examples, in which all temperatures are in ° C., and acetone-insolubles were determined by the A.O.C.S. method referred to above. TLC is thin layer chromatography.

EXAMPLE 1

A commercial unbleached Canadian soya phosphatide of average grade having the following approximate composition was used as starting material.

| | Parts by wt. |
|---|---|
| Triglycerides | 40 |
| Total acetone insolubles | 60 |
| Lecithin | 15 |
| Cephalin | 12 |
| Inositol phosphatides | 23 |
| Sugars, steroids and salts | 10 |
| Water | <1 |
| Total phosphorus content | 2.2 |

This phosphatide (100 g.) and acetic anhydride (4 g.) were stirred together vigorously under nitrogen at 74° (bath temperature) for 2 hours and then cooled rapidly to 20°. The acylated mixture was stirred with boiling acetone (200 ml., with 4 ml. added water), cooled to 0° in an ice-water bath and the acetone solution containing triglyceride oil, acetic acid and anhydride decanted off. The insoluble residue from this first extraction was stirred with a boiling mixture of acetone (200 ml., +4 ml. water) and triethylamine (6 ml., corresponding to the provision of a pH of above 9 in a 1% aqueous dispersion), cooled to 0° and the solvent decanted off: this extraction was repeated using acetone (200 ml., +4 ml. water) and triethylamine (2 ml.). The product was triturated with boiling acetone (200 ml.) and the hot acetone decanted off: this fourth acetone extraction was repeated, and the product finally triturated with acetone (200 ml.) at 20° C., filtered off and dried under reduced pressure at 20° C. This yielded a crisp straw-coloured solid (42.1 g.) containing 3.2% phosphorus, 32% of lecithin, 1% of triglyceride oil and practically no cephalin, but about 1–2% of acetylcephalin as estimated by TLC.

EXAMPLE 2

Example 1 was repeated using as acylating agent capric anhydride (10.0 g.) instead of acetic anhydride, and a bath temperature within the range of 70° to 82°. One-half (55 g.) of the acylated material was processed and yielded a solid product (22 g.).

EXAMPLE 3

The commercial phosphatide of Example 1 (100 g.) was heated at 75° for 2 hours under nitrogen with a mixed anhydride (20 g.) prepared from soyabean oil fatty acids by trans-anhydridisation with acetic anhydride. A portion (10 g.) of the acylation mixture was submitted to five extractions with acetone (40 ml., +0.8 ml. water) as in Example 1, the acetone containing triethylamine in the second and third extraction (0.6 g. and 0.2 g. amine respectively, sufficient to provide basicity equivalent to a pH of above 9 in a 1% aqueous dispersion). The final product was obtained as a solid residue (3.6 g.).

When a similar series of extractions was carried out on a second portion (10 g.) of the acylation mixture, but without the additions of amine, the yield of insoluble residue was 4.6 g. and the product contained a substantial proportion of acylcephalin.

EXAMPLE 4

A commercial alcohol-soluble phosphatide preparation containing 30% acetone insolubles and enriched in lecithin was partially defatted by acetone extraction to give an acetone-insoluble residue having the following approximate composition.

| | Parts by weight |
|---|---|
| Triglycerides | 15 |
| Total acetone insolubles | 85 |
| Lecithin | 55 |
| Cephalin | 10 |
| Inositol phosphatides | 5 |
| Sugars, steroids and salts | 15 |
| Water | 1 |

This phosphatide (8.5 g.) was dissolved in chloroform (50 ml.), acetic anhydride (2 ml.) added and the mixture heated under reflux for one hour. The solvent, acetic acid and excess anhydride were removed by evaporation in a rotary evaporator under reduced pressure. To the residue was added acetone (100 ml., containing 2% water) in which triethylamine (0.2 ml., sufficient to provide a basicity corresponding to a pH of over 9 in a 1% aqueous dispersion) had been incorporated, and the mixture was heated to boiling, allowed to cool to room temperature and then cooled in ice-water: the acetone was decanted off and traces of acetone removed from the residue at room temperature under reduced pressure, giving a product (5.2 g.) which TLC showed had lecithin as the predominant constituent and only small traces of cephalin and acylcephalin.

In comparative experiments it was found that if the acylation and amine respectively were omitted, yields of 7.5 g. and 6.4 g. insoluble product were obtained containing substantial proportions of cephalin or acylcephalin respectively.

EXAMPLE 5

A commercial alcohol-insoluble defatted phosphatide fraction enriched in cephalin having the following approximate composition was used as starting material.

| | Parts by weight |
|---|---|
| Triglycerides | 4 |
| Total acetone insolubles | 96 |
| Lecithin | 4 |
| Cephalin | 28.5 |
| Inositol phosphatides | 55 |
| Sugars, steroids and salts | 8.5 |

This phosphatide (25 g.) was dissolved in n-hexane (100 ml.) and acetic anhydride (1.5 g.) added: the mixture was heated under reflux in a nitrogen atmosphere for 1 hour, cooled to 30° and triethylamine (5 ml.) added. After thorough mixing the resulting solution (containing sufficient base to provide a pH of above 9 in a 1% aqueous dispersion) was introduced slowly during 15 minutes into vigorously-stirred acetone (250 ml.). After completion of addition the precipitate was filtered off, stirred with acetone (250 ml.) and the suspension again filtered: the residue was dried under reduced pressure to give a product (18.4 g.) which TLC showed to be practically free from cephalin and acetylcephalin.

In a comparative experiment similar in all respects except that the acetic anhydride was omitted, the yield of residue was 23.2 g. and it contained most of the original cephalin.

EXAMPLE 6

Example 1 was repeated using, instead of the commercial Canadian soya phosphatide, a commercial alcohol-insoluble fraction prepared from soya phosphatide by extracting 1 part by weight of phosphatide with 3.5 parts of aqueous 90% ethanol at room temperature for a few minutes, decanting off the ethanol and taking the residue, which had the following approximate composition.

|  | Parts by weight |
| --- | --- |
| Triglycerides | 41 |
| Total acetone insolubles | 59 |
| Lecithin | 12 |
| Cephalin | 12 |
| Inositol phosphatides | 29 |
| Sugars, steroids and salts | 6 |
| Water | <1 |

From the phosphatide starting material (100 g.) there was obtained a solid product (34 g.) containing only traces of cephalin and acylcephalin.

EXAMPLE 7

The alcohol-insoluble phosphatide fraction of Example 6 (100 g.) was acetylated with acetic anhydride (4 g.) as in Example 1, and to the acylated mixture at 20–22° was added acetone (25 ml.) and triethylamine (10 ml., sufficient to provide basicity corresponding to a pH of above 9 in a 1% aqueous dispersion) and the mixture stirred for 10 minutes and then poured slowly into vigorously-stirred acetone (1,000 ml., +20 ml. water). The precipitate was filtered off, suspended in acetone (1,000 ml.) and the suspension heated to boiling and then cooled while stirring for 30 minutes to 15–18°.

The product (44.8 g.) was isolated by filtering, washing with acetone (500 ml.) and drying under reduced pressure.

EXAMPLE 8

The alcohol-insoluble phosphatide fraction of Example 6 (100 g.) was acetylated with acetic anhydride (4 g.) as in Example 1, diethylamine (5.3 g.) was dispersed in the acylated mixture (giving a basicity corresponding to a pH of above 9 in a 1% aqueous dispersion), and it was then slowly poured into vigorously-stirred acetone (1,000 ml. +20 ml. water) at 54°: stirring was continued for 30 minutes during cooling to room temperature, the suspended material separated by filtration, re-suspended and stirred in acetone (1,000 ml.) for 30 minutes, and finally filtered, washed with acetone (500 ml.) and dried under reduced pressure to give the product (42.8 g.).

EXAMPLE 9

Example 8 was repeated in all respects except that acetone at room temperature was used throughout. The yield of product was 44.0 g.

EXAMPLE 10

The procedure of Exampe 9 was repeated, except that trimethylamine (4.4 g.) was employed instead of diethylamine. As this amine is highly volatile (B.P. 3.5°), it was added to the acylated mixture cooled to −5° C. as a 20% solution in cold acetone and the mixture then allowed to warm to room temperature. The yield of product was 49.1 g.

EXAMPLE 11

Example 7 was repeated except that instead of triethylamine there was used as nitrogen base concentrated aqueous ammonia solution (15 ml., S.G. 0.88, sufficient to provide basicity corresponding to a pH of above 9 in a 1% aqueous dispersion). There was obtained a yield of 47.4 g. of product.

EXAMPLE 12

The alcohol-insoluble cephalin-enriched phosphatide fraction or Example 6 (100 g.) was dispersed in acetone (50 ml., +2% water), acetic anhydride (2.75 g.) and triethylamine (6.5 g.) were added to the dispersion and the mixture was shaken for 10 minutes at room temperature (20°). A test showed that a 1% dispersion of the reaction mixture in water had a pH of 9.6. Examination by TLC on silica with a mixture of chloroform, methanol and water (65:25:4 proportions by volume) showed an absence of ninhydrin-positive substances, showing the absence of unacylated cephalin.

The acetylated mixture was introduced during 10 minutes into vigorously-stirred acetone (1,000 ml.) containing 10 ml. water and butylated cresol (100 mg.) as antioxidant, and the mixture stirred for another 15 minutes and then filtered. The residue was suspended in acetone (500 ml., 5 ml. water) containing butylated cresol (50 mg.), stirred and filtered: this washing was repeated with the solvent at 40–50° and the final residue dried at room temperature under reduced pressure.

The product (40.3 g.) was shown by TLC to contain traces of acetylcephalin but no cephalin.

EXAMPLE 13

The soya phosphatide starting material of Example 6 (50 g.) was suspended in methyl acetate (50 ml.) and acetic anhydride (1.38 g.) and triethylamine (3.25 g.) were added and the mixture shaken for 10 minutes at 18–20°. The product was submitted to TLC and testing showed the absence of ninhydrin-positive material, indicating that acetylation was complete.

The acylated mixture (which was sufficiently basic to provide a pH of above 9 in a 1% aqueous dispersion) was added during 10 minutes to vigorously-stirred methyl acetate (500 ml.) and stirred for a further 15 minutes. The insolubles were filtered off and the residue again suspended in methyl acetate (250 ml.), stirred for 15 minutes and the suspension again filtered. This extraction was repeated with methyl acetate at 50–55° (250 ml.), to give a dark gum which was dried in a vacuum at room temperature, yielding a dark brown crisp solid (25.1 g.), TLC of which showed the presence of small amounts of acylcephalin but no cephalin.

EXAMPLE 14

To the alcohol-insoluble fraction of soya phosphatide of Example 6 (100 g.) was added acetone (15 ml.), the mixture stirred until homogeneous and then poured into acetone (1000 ml., containing 20 ml. water). The precipitate was filtered off, the filtrate containing fat was discarded, and the precipitate resuspended in acetone (200 ml., containing 4 ml. water). To the stirred suspension was added triethylamine (6.5 g., sufficient to provide the final reaction mixture with a basicity corresponding to a pH of above 9 in an aqueous dispersion) and acetic anhydride (2.75 ml.), and the mixture stirred at ambient temperature for 30 minutes, and filtered. The residue was extracted twice with acetone (200 ml., containing 4 ml.

water), the first extraction being at room temperature and the second at 50°, and dried under reduced pressure at 35° to give a product (48 g.) containing only a small amount of N-acetylcephalin.

EXAMPLE 15

The alcohol-insoluble defatted phosphatide fraction of Example 5 (10 g.), phthalic anhydride (2.8 g.) and triethylamine (10 ml., sufficient to provide the basic conditions required) were together dissolved in chloroform (30 ml.) and the solution allowed to stand at ambient temperature for 15 minutes. TLC showed that the mixture then contained no free cephalin. Solvent was removed by evaporation and the residue extracted 3 times with acetone (100 ml., containing 2 ml. water) at ambient temperature: the insoluble residue was dried under reduced pressure to give a product (5.9 g.) which TLC showed was practically free of cephalin and o - carboxybenzoylcephalin. The acetone extract on evaporation gave as a gum o-carboxybenzoylcephalin.

Gum thus obtained (10 g.) was chromatographed on a neutral silica gel column and the column eluted first with chloroform, and then with chloroform containing 10% methanol. From the eluate was isolated the o-carboxybenzoylcephalin (3.73 g.) as a solid, to this was added acetic anhydride (3 ml.) and chloroform (30 ml.) and the solution formed allowed to stand for 30 minutes. TLC examination of the mixture then showed ring closure to the phthalimido compound N-phthaloylcephalin was complete. The mixture was evaporated to dryness under reduced pressure, hydrazine hydrate (0.6 g.) in ethanol (30 ml.) added, the solution heated under gentle reflux for 2 hours and the cooled product examined by TLC, which showed it to consist of free cephalin.

What is claimed is:

1. A process for separating an N-acylphosphatide and a phosphatide without an acylatable amino group from a mixture comprising them, which comprises adding to the mixture a sufficient amount of a nitrogen base of $pK_a$ at least 9 to provide the equivalent of pH at least 8.5 under aqueous conditions, extracting the mixture with acetone or methyl acetate, and separating the phases containing the N-acylphosphatide and the phosphatide without an acylatable amino group.

2. A process for the treatment of phosphatides which comprises contacting a phosphatide mixture that comprises N-acylatable and non-N-acylatable phosphatides with an acylating agent to convert the N-acylatable phosphatide to N-acylphosphatide, adding to the reaction mixture a sufficient amount of a nitrogen base of $pK_a$ at least 9 to provide the equivalent of pH at least 8.5 under aqueous conditions, extracting the mixture with acetone or methyl acetate, and separating the phases containing the n-acylphosphatide and the non-N-acylatable phosphatide.

3. A process according to claim 2, wherein the phosphatide mixture comprises cephalin and lecithin.

4. A process according to claim 3, wherein the phosphatide mixture contains 0.1 to 20 parts of lecithin to each part by weight of cephalin.

5. A process according to claim 2, wherein the acylating agent is a fatty acid anhydride.

6. A process according to claim 5, wherein the acid anhydride is acetic anhydride.

7. A process according to claim 2, wherein acylation is effected in the presence of a non-acylatable amine as a catalyst.

8. A process according to claim 7, wherein acylation and solvent-extraction are effected simultaneously.

9. A process according to claim 2, wherein the nitrogen base is ammonia, diethylamine, trimethylamine or triethylamine.

10. A process according to claim 2 wherein acylation is carried out without a catalyst, and the nitrogen base is then added to the reaction mixture without previous removal of unreactive acylating agent.

References Cited

UNITED STATES PATENTS

| | | | |
|---|---|---|---|
| 3,047,597 | 7/1962 | Pardun | 260—403 |
| 3,301,881 | 1/1967 | Davis | 260—403 |

ELBERT L. ROBERTS, Primary Examiner